June 20, 1933.    W. T. STEPHENS    1,914,963
ADJUSTABLE DRAFT RIGGING
Filed Aug. 22, 1931
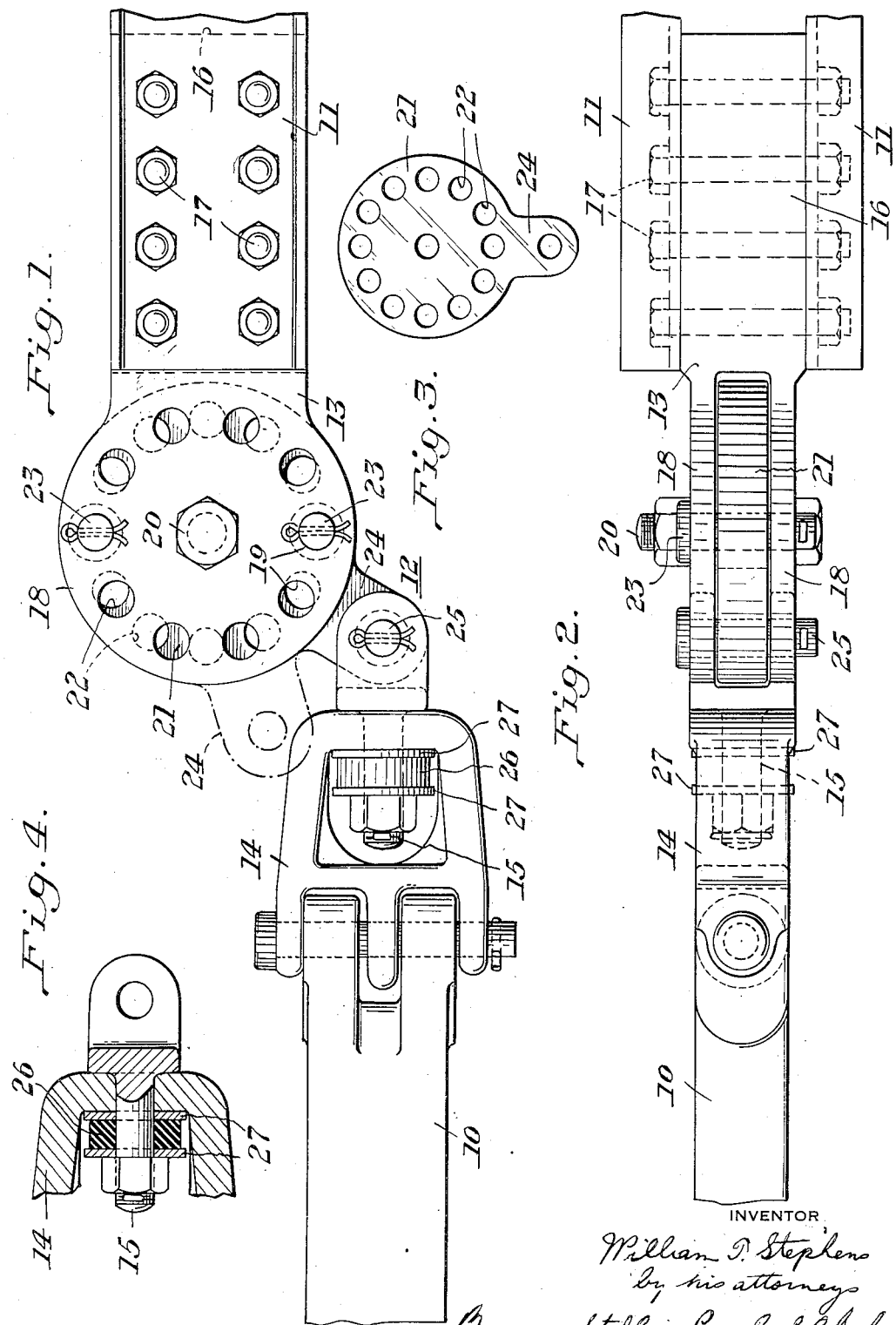
INVENTOR
William T. Stephens
by his attorneys
Byrnes, Stebbins, Parmelee & Blenko Patented June 20, 1933

1,914,963

UNITED STATES PATENT OFFICE

WILLIAM T. STEPHENS, OF YOUNGSTOWN, OHIO, ASSIGNOR TO THE COMMERCIAL SHEARING & STAMPING COMPANY, OF YOUNGSTOWN, OHIO, A CORPORATION OF OHIO

ADJUSTABLE DRAFT RIGGING

Application filed August 22, 1931. Serial No. 558,679.

My invention relates to a mechanism for connecting a vehicle to a source of motive power and, in particular, to a draft hitch for connecting a trailer to a tractor.

One of the objects of the invention is to provide a hitch for connecting a trailer to a tractor, in which the height of the member connected to the tractor drawbar may be varied so as to permit the use of trailers with different makes of tractors which have widely varying drawbar heights. I am aware that it has been suggested previously to provide trailer hitches with means for adjusting the height thereof, but none of the structures of the prior art with which I am familiar can be considered a satisfactory device for the service which I contemplate.

In handling heavy loads by means of tractors, it is desirable that the hitch connecting the load to the tractor be quite stable, so as to resist side thrust. It is also an advantage to have the hitch as short or close as possible, so as to reduce clearance between the tractor and trailer and to prevent the application of unnecessary strains to the hitch. I have invented a hitch for connecting a trailer and a tractor, which incorporates these desirable features and, in addition, is characterized by a novel construction and arrangement which will be fully described hereinafter and finally pointed out in the claims.

In accordance with my invention, I provide the draft members of a trailer or other vehicle with a drawbar head, consisting of a draft block with integral spaced circular members or ears projecting forwardly thereof. Between the spaced circular members, I employ an adjustable disc pivoted to said members. The disc is provided with a tongue pivoted to clevis bolt. A clevis on the bolt permits connection to be made to a tractor drawbar very simply by means of a coupling pin. The adjustment is effected by means of a plurality of holes in the circular members or ears and in the disc. After adjusting the disc for the desired drawbar height, it may be locked by means of suitable pins. A rubber shock pad is carried on the bolt for engagement with the clevis.

A hitch constructed in accordance with the invention incorporates the adjustability in the draw-head of the trailer and forms a short or a close hitch with the tractor drawbar. At the same time, a wide range of adjustability in very small steps is provided and, by reason of the closeness of the connection, the hitch may be made amply strong enough to stand the side thrust which is apt to be developed.

For a more complete understanding of the invention, reference is made to the accompanying drawing, illustrating a present preferred embodiment.

In the drawing,

Figure 1 is a side elevation with parts broken away, showing the invention connecting a tractor drawbar and the frame of a vehicle to be drawn thereby;

Figure 2 is a plan view of the structure shown in Figure 1;

Figure 3 is a plan view of the adjustable disc; and

Figure 4 is a sectional view through the clevis and a resilient shock-absorbing pad used in connection therewith.

Referring now in detail to the drawing, the drawbar of a tractor is indicated at 10. The frame members of a vehicle to be drawn by a tractor are illustrated at 11. A hitch 12 serves to connect the frame members 11 to the drawbar 10.

The hitch 12 comprises a draw-head 13 secured to the frame members 11 and a clevis 14 connected to the draw-head by means of a clevis bolt 15.

The draw-head 13 comprises a block 16 which is secured between the frame members 11 by bolts 17. Integral with the block 16, a pair of forwardly projecting circular members or ears 18 are formed. The circular members are provided with a series of holes 19 adjacent their periphery. A central bolt 20 traversing the ears 18 provides a pivotal bearing for a disc 21 positioned between the ears and having a series of holes 22 formed therein. As will be apparent from Figure 1, the spacing of the holes 19 differs slightly from that of the holes 22, for a purpose which will hereinafter appear. Pins 23, traversing alined holes in the ears 18 and the disc 21, maintain any desired adjusted position of the latter with respect to the former.

The disc 21 is provided with an integral tongue or projection 24. The tongue 24 is pivotally secured by a pin 25 to the clevis-bolt 15. The tongue is received between the eyes of the bolt. The clevis 14 connects the bolt 15 to the drawbar 10. A resilient shock pad or block 26 of rubber serves to cushion draft shocks imparted to the hitch by the drawbar 10 through the clevis 14. On each side of the pad 26, washers 27 are positioned.

The operation of the invention will probably be apparent from the foregoing description of the structure involved but a few additional points remain to be made clear.

By providing the holes 19 and the holes 22 with different spacings, a wide range of adjustments in very small steps is provided. If it is desired to increase the height of the drawbar for which the hitch is suggested, as shown in Figure 1, the disc 21 may be adjusted so that the holes adjacent those in which the pins 23 are positioned are in alinement, after removing the pins from the holes in which they are shown. A slightly higher adjustment may be effected by alining the next set of holes and so on around the circumference of the ears 18. In other words, the pins 23 may be advanced one set of holes to cause a slight elevation of the height of the hitch. Each time the pins are advanced one set of holes, the disc 21 is advanced only a fraction of the angle between adjacent holes therein. A very fine adjustment is thus possible. Obviously, of course, the disc may be adjusted in larger steps by changing the relation of the holes in the ears and disc, which are in alinement. The former adjustment gives something similar to a vernier, while the latter adjustment effects greater changes in the drawbar height. One of the other adjusted positions of the disc 21 is shown in dotted lines in Figure 1.

Numerous advantages will be apparent in the construction described above. In the first plate, the hitch is closely coupled so that it can be designed to withstand the lateral thrust to which it may be subjected. The adjustable feature is incorporated in the drawbar head on the trailer, and the construction is such that a wide range of adjustments is possible in both small and large steps. The rubber shock pad absorbs the draft blows transmitted to the hitch without permitting much travel of the clevis on its bolt. Wear of the parts is thus minimized.

Although I have disclosed herein but a single preferred embodiment of the invention, it will be recognized that changes in the construction shown may be resorted to without departing from the spirit of the invention as set forth in the appended claims.

I claim:
1. An adjustable draft hitch comprising spaced members having alined, transverse holes therethrough arranged in a circle, a disc pivoted on said members centrally of said circle, holes through said disc arranged in the circle but spaced differently from said first-mentioned holes, pins for maintaining an adjusted position of said disc, and means for connecting said disc to a drawbar.

2. An adjustable hitch for a vehicle comprising a pair of spaced members secured to said vehicle and having alined holes therein arranged in a circle, a disc pivoted to said members centrally of said circle and having holes spaced differently from the first-mentioned holes adapted to be successively alined with the latter, and means for connecting said disc to a drawbar.

3. A draft hitch including a fixed disc, a disc rotatably mounted thereon, draft members secured to said discs, and means for adjusting the relative height of said members including a series of peripherally spaced holes in each of said discs, the spacing between the holes of one disc being slightly different from that of the other, and a pin for traversing alined holes in said discs.

In testimony whereof I have hereunto set my hand.

WILLIAM T. STEPHENS.